US00RE34657E

United States Patent [19]

La See

[11] E Patent Number: Re. 34,657

[45] Reissued Date of Patent: Jul. 12, 1994

[54] CAM ADJUSTMENT DEVICE FOR CASEMENT WINDOW UNIT

[76] Inventor: Jack C. La See, 308 W. Cedar, Abbotsford, Wis. 54405

[21] Appl. No.: 925,620

[22] Filed: Aug. 6, 1992

Related U.S. Patent Documents

Reissue of:

[64] Patent No.: 5,0,740,754
Issued: Dec. 24, 1991
Appl. No.: 724,587
Filed: Jul. 1, 1991

[51] Int. Cl.[5] ..... E05D 15/30

[52] U.S. Cl. ..... 49/252; 49/396

[58] Field of Search ..... 49/248, 396, 251, 252, 49/249, 250; 16/235, 239

[56] References Cited

U.S. PATENT DOCUMENTS 4,790,106 12/1988 La See ..... 49/252

*Primary Examiner*—Philip C. Kannan
*Attorney, Agent, or Firm*—Herman H. Bains

[57] ABSTRACT

A track and hinge assembly set for with a casement window sash unit comprises a pair of track and hinge assemblies each including a track which is mounted on a horizontal frame member of the window frame. Each assembly also includes a toggle hinge including a pair of pivotally interconnected links, one of which is secured to the casement sash and pivotally and slidably connected to the track. The other link is pivotally connected to a cam which is shiftably mounted on the track. In one embodiment, the cam is longitudinally shiftable relative to the track which repositions the pivotal connection between a toggle link and cam to overcome sash sag. In other embodiments, the cam rotated relative to the track to reposition the pivotal connection between the cam and a toggle link to correct sash sag.

9 Claims, 2 Drawing Sheets

CAM ADJUSTMENT DEVICE FOR CASEMENT WINDOW UNIT

Matter enclosed in heavy brackets [ ] appears in the original patent but forms no part of this reissue specification; matter printed in italics indicates the additions made by reissue.

FIELD OF THE INVENTION

This invention relates to an adjustable casement window sash unit which is adjustable to overcome sash sag.

BACKGROUND OF THE INVENTION

Sash sag is a common problem associated with the installation of residential casement windows. Sash sag or misalignment results from poor installation by the installers or poor hinge positioning by the window manufacturers. In my U.S. Pat. No. 4,790,106, I have provided a cam adjustment device which is effective in correction of sash sag during installation of residential casement windows. The present invention is directed to an improved version of the cam adjustment device disclosed in my U.S. Pat. No. 4,790,106.

SUMMARY OF THE INVENTION

An object of this invention is to provide a novel and improved cam adjustment device for casement window sash units which is operable for repositioning the casement sash to readily correct any misalignment of the casement sash. In one embodiment of the invention, an index cam is provided with a plurality of serrations which matingly engage serrations on the track of the hinge assembly of the casement sash. The outer end of the index cam has a pivot post thereon which is connected to a toggle link of the track and hinge assembly. Adjustment of the index cam shifts the toggle hinge link (upper or lower track and hinge assembly) of the casement sash in the selected direction. Thus either or both hinges of a casement sash unit may be selectively adjusted to reposition the casement sash and thereby correct sash sag.

In other embodiments, the index cam is rotated to reposition the pivot post and thereby adjust the casement sash unit. In all embodiments, adjustment can be made by a homeowner during installation or after installation without the use of any special tools.

FIGURES OF THE DRAWING

FIG. 1 is an elevational view of a casement window illustrating sash sag,

FIG. 2 is a plan view of a track and hinge assembly of the casement sash unit incorporating the novel cam device, FIG. 3 is an exploded fragmentary perspective view of a portion of the track of the track and hinge assembly and illustrating the novel index cam, FIG. 4 is a fragmentary elevational view of the track and the index cam, FIG. 5 is a fragmentary elevational view of the track and the index cam similar to FIG. 4 but illustrating the index cam in an adjusted position, FIG. 6 is an exploded fragmentary perspective view similar to FIG. 3 but illustrating a different embodiment of the index cam, FIG. 7 is an exploded fragmentary perspective view similar to FIG. 6 but illustrating another embodiment of the index cam.

DESCRIPTION OF THE PREFERRED EMBODIMENT

Figure 1:
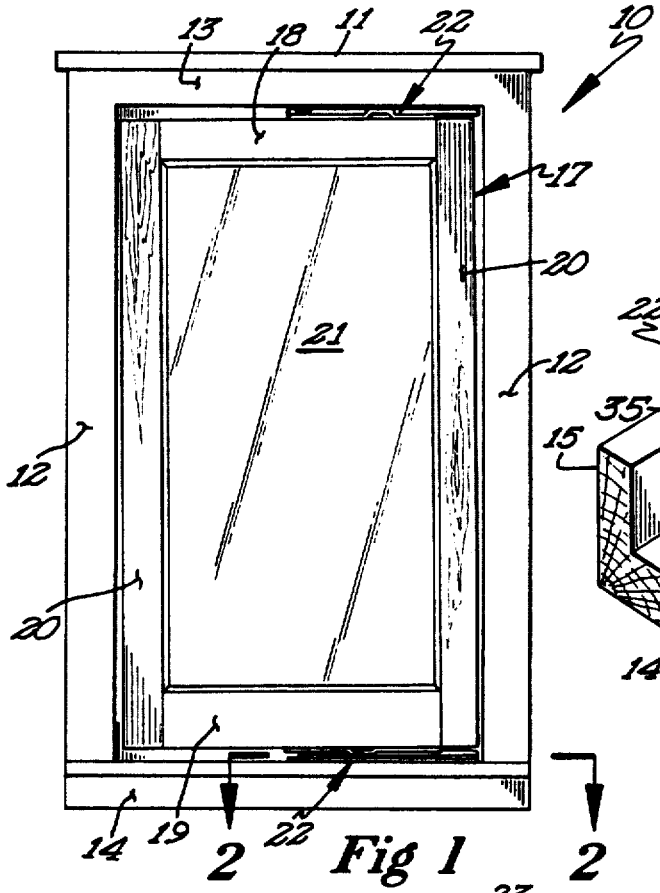

Referring now to the drawings and more specifically to FIG. 1-5, it will be seen that a conventional residential casement sash unit, designated generally by the reference numeral 10, is thereshown. The casement sash unit 10 includes a generally rectangular shaped window frame 11 including vertical frame members 12, a horizontal upper frame 13, and a horizontal lower frame member 14. The horizontal frame members are each provided with a conventional stop 15 and a sill 16 of well known construction.

The casement sash unit 10 also includes a casement window sash 17 which is comprised of an upper horizontal member 18, a lower horizontal frame member 19, spaced apart vertical frame members 20 and a transparent glass panel 21. The casement sash 17 is provided with upper and lower track and hinge assemblies 22 which shiftably mount the casement window sash to the window frame 11.

Each upper and lower track and hinge assembly 22 includes an elongate track 23 and a toggle hinge 24. The tracks 23 for the hinge assemblies are secured to the horizontal upper frame member 13 and the horizontal lower frame member 14 of the window frame. The toggle hinge 24 pivotally and slidably connect the casement sash to the associated track 23.

The toggle hinge 24 includes an elongate link 25 which has one end thereof pivotally connected to one end portion of the horizontal track plate 26 of the track 23 by an index cam 27. The other end of the elongate link 25 is pivotally connected to the mid portion of an elongate link 28 by pivot 29. The link 28 has a plurality of longitudinally spaced apart openings 30 therein which accommodate screws for securing the link 28 to the window sash 20. It will be seen that the lower track and hinge assembly 22 is connected to the lower horizontal frame member 19 of the casement window sash 17 while the upper track and hinge assembly is connected to the upper horizontal frame member 18 of the casement window sash.

The inner end of the elongate link 28 is pivotally connected to a slide block 31 by a pivot 32 to permit pivoting of the link and the window sash 17 about a vertical axes. The horizontal track plate 26 of the track 23 is provided with a vertical flange 33 which has an arcuate overhang portion 34. The slide block 31 engages the arcuate overhang portion 34 to permit sliding movement of the block 31 longitudinally of the track during pivotal movement of the link 28 and the casement window sash.

Figure 3:
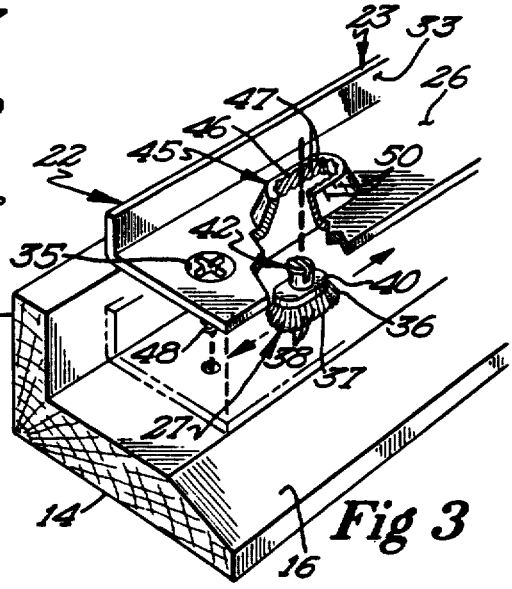
Figure 2:
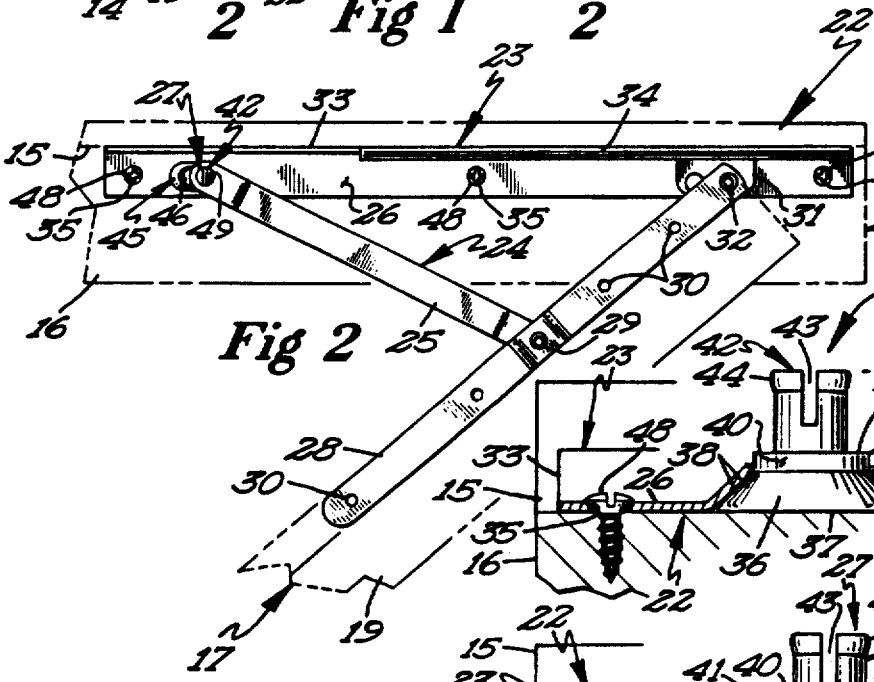

The link 25 of the toggle hinge 24 is pivotally connected to the novel and improved index cam 27 which is longitudinally shiftable relative to the track 23. The shifting movement of the index cam 27 causes shifting movement of the hinge and adjustment of the attached casement sash relative to the track 23. In this regard, it will be seen that the index cam 27 includes an elongate base 36 which is tapered downwardly and outwardly. The base 36 of the cam 27 has an elongate oval shaped lower planar surface 37. The base 36 of the index cam has serrations 38 formed throughout its periphery as best seen in FIG. 3.

The index cam 27 also includes an intermediate element 39 which is of oval configuration and has an oval outer surface 40. The intermediate element 39 of the cam 27 presents a substantially flat upper surface 41 having a link engaging pivot 42 integral therewith and which projects upwardly therefrom. The link engaging pivot 42 has an upwardly opening transverse slot 43 therein and the upper end portion of the pivot is enlarged to define a snap lock element 44. The diameter of the opening 49 in the outer end of the link 25 is slightly less than the diameter defined by the snap lock element 44 so that when the link is forced over the snap lock element, the link is snap coupled to the pivot element 42. The slot 43 provides a spring action to the pivot 42 to permit the link opening to be forced over the snap lock element. With this arrangement, the link 25 is positively secured to the pivot 42 but is freely journaled thereon to permit pivoting movement of the link relative to the pivot 42.

It will be seen that the horizontal track plate 26 has an upwardly struck cam engaging element 45 formed at one end portion thereof, and this cam engaging element has an oval opening 46 in the upper end thereof. The inner surface of the cam engaging element 45 has inwardly projecting serrations 47 formed through the entire periphery thereof. The index cam 27 is positioned within the cam engaging element 45 so that the intermediate cam element 39 projects through the opening 46. The oval opening 46 corresponds in shape to the intermediate element but is slightly larger than the intermediate element 39. Similarly, the cavity defined by the cam-engaging element 45 corresponds in shape to the cam base but is slightly larger than the cam base 36. With this arrangement, the index cam 27 may be moved longitudinally relative to the cam engaging element 45 in either direction.

In the embodiment shown, the index cam 27 is normally disposed in a centered position relative to the cam engaging element 45 of the track 23. Suitable indicia 50 are provided on the exterior surface of the cam engaging element 45 to indicate the centered position. The index cam 27 may be shifted longitudinally in either direction from the centered position to permit a 0.100 inch adjustment in either direction relative to the centered position.

Figure 4:
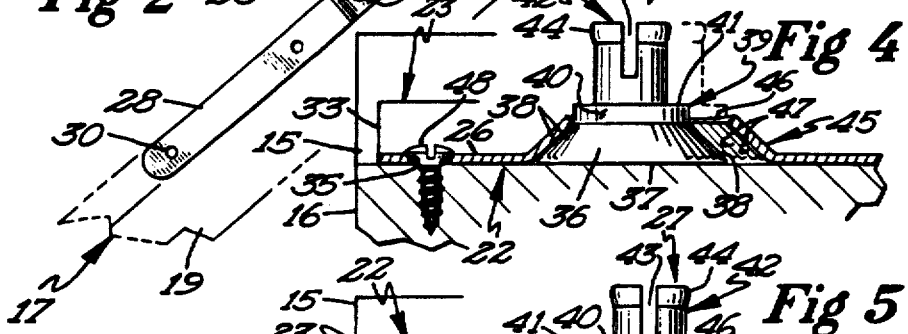
Figure 5:
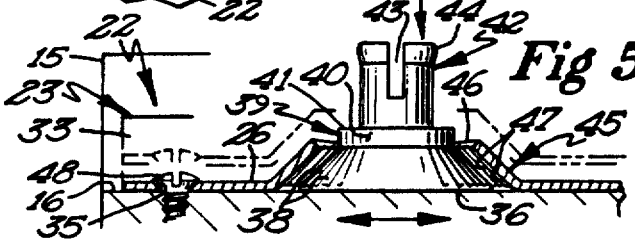

Referring now to FIGS. 4–5, it will be seen that the openings 35 in the track 23 accommodate screw 48 which secure the horizontal track member to the horizontal frame member of the window frame. When it is necessary to adjust the casement sash 17, the screws 48 next adjacent the index cam 27 may be loosened and removed to permit a screw driver to be inserted below the horizontal track plate so that the track plate may be raised and the index cam adjusted relative to the track. During the adjustment, the index cam 27 will be shifted longitudinally relative to the track 23 from a centered position (FIG. 4), in either direction, and the track will then be locked to the index cam 27 by the coaction of the serrations on the track 23 and cam 27. Repositioning the index cam 27 shifts the pivot element 42 to thereby cause repositioning the link 25 and the casement sash as seen in FIG. 4. The engagement of the intermediate element 39 of the index cam 27 with the adjacent edge of the cam engaging element defining the opening 46 limits movement of the index cam. In this adjustment procedure, usually the upper and lower track and hinge assemblies are both adjusted. The screw 48 will be then be reinserted to again secure the horizontal track plate to the window frame.

With this arrangement, the casement sash 17 may be readily adjusted by a homeowner with a minimum of effort and in a minimum amount of time to correct sash sag. The index cam 27 may be formed of a rigid plastic and it may be provided with a steel insert to impart strength to the cam. Alternatively, the index cam may also be made of stainless spring steel.

Figure 6:
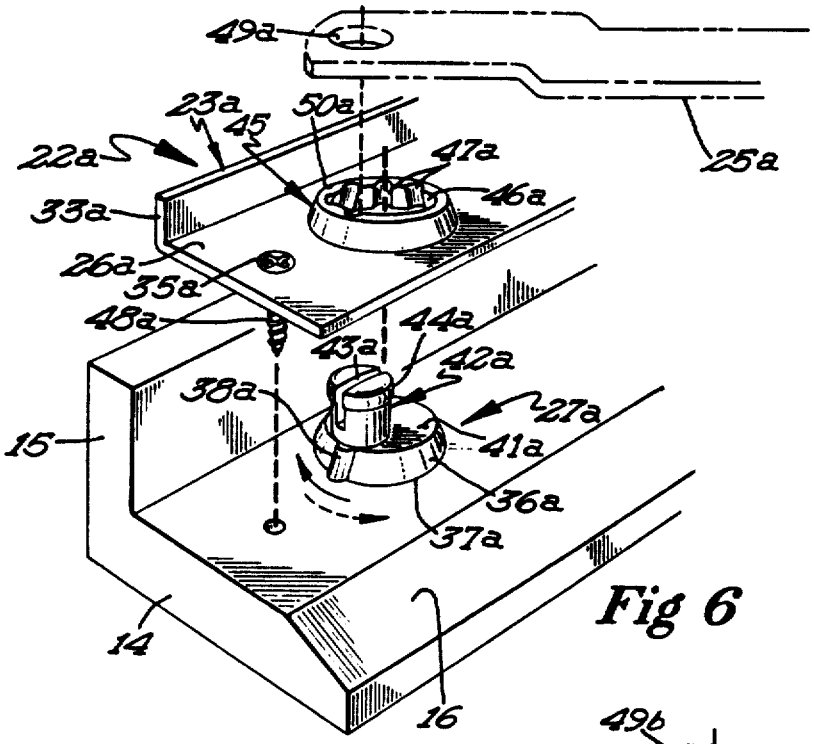

Referring now to FIG. 6, it will be seen that a different embodiment of the index cam adjustment device is thereshown. Although the window frame and casement sash are not shown in their entirety, it will be understood that the window frame and casement sash unit are identical to that shown in the embodiment of FIGS. 1–5. The only essential difference of this embodiment from that of FIG. 1 is the construction and operation of the index cam and the cam engaging element.

The casement window sash is provided with upper and lower track and hinge assemblies 22a each including a track 23a having a toggle link hinge including a link 25a substantially identical to that shown in the embodiment of FIGS. 1–5. The link 25a is pivotally connected to an index cam 27a. A track 23a includes a vertical flange 33a having an arcuate overhang (not shown) in the manner of the embodiments of FIGS. 1–5. The track is provided with a plurality of longitudinally spaced apart openings 35a for accommodating the screws 48a to permit attachment of the track to the horizontal frame member of the window frame.

The index cam 27a includes a frustro-conical base 36a having a substantially planar lower surface 37a and having an outwardly projecting detent 38a integral therewith and projecting outwardly therefrom. The frustro-conical base 36a has a substantially flat upper surface 41a which is provided with an eccentrically positioned link engaging pivot 42a projecting upwardly therefrom. The pivot 42a has an upwardly facing slot 43a therein and is provided with an outwardly projecting annular snap-lock element 44a in the manner of the embodiment of the FIGS. 1–5. The slot 43a in the pivot provides the spring effect of the pivot when the opening 49a in the link 25a is forced over the pivot 42a.

The track 23a has an upwardly struck frustro-conical cam engaging element 45a adjacent one end thereof. The frustro-conical cam engaging element 45a has an opening 46a in its upper end and is provided with a plurality of arcuately spaced apart locking recesses 47a in the inner surface thereof. The spacing between the adjacent locking recesses 47a is approximately 30 degrees with the centermost 50a of the recesses defining a center position. When the casement sash is installed, the cam is positioned so that the locking detent 38a of the index cam is positioned in the center position. However, the index cam can be shifted in either direction to the first locking recess which will shift the casement sash 0.04 inches from the center position. However, if the index cam is indexed to the furtherest locking recess in either direction, the casement sash will be shifted 0.08 inches in either direction. Adjustment of the cam 27a adjusts the position of the pivot connection between the index cam and link 25a.

Figure 7:
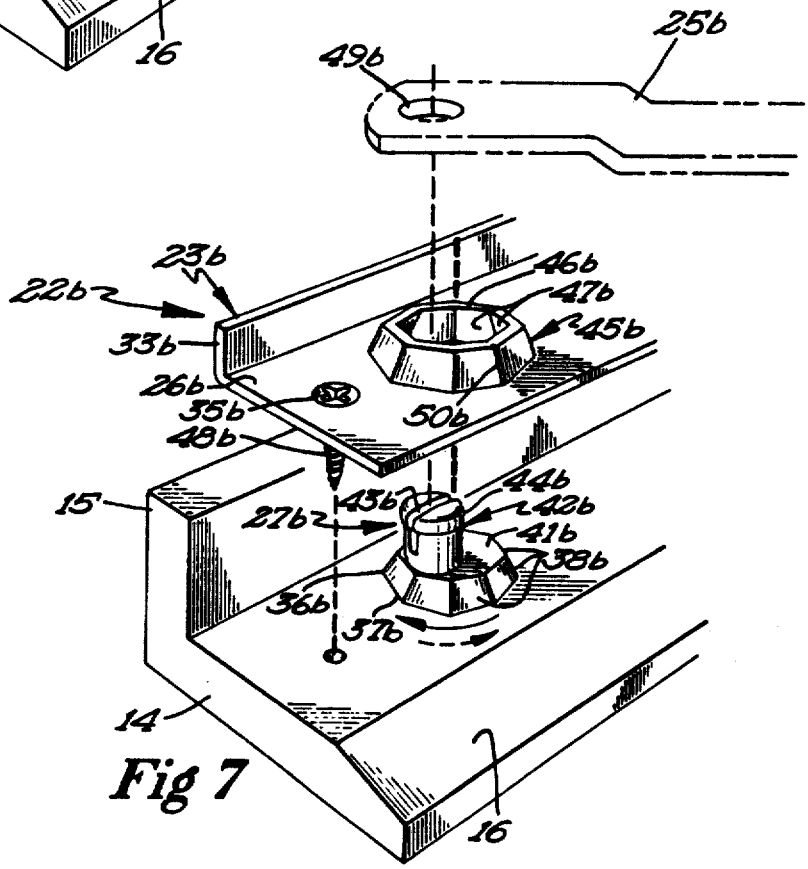

Referring now to FIG. 7, it will be seen that a further embodiment of the index cam is thereshown. It is again pointed out that although only a portion of the window frame and casement sash unit are shown, the window frame and casement sash are identical to that illustrated in FIG. 1. The casement sash is provided with upper and lower track and hinge assemblies 22b each including a track 23b having a toggle hinge including a link 25b. With the exception of the design of the index cam and cam engaging element, the track and hinge assembly 22b is identical to that of the embodiment of FIGS. 1-5. Link 25b is provided with an opening 49b in the outer end thereof which permits pivotal connection of the link to the index cam 27b. The track 23b includes a vertical flange 33b having an arcuate overhang (not shown) identical to that illustrated in FIG. 1-5. The track is provided with a plurality of longitudinally spaced apart openings 35b that accommodate screws 48b to permit attachment of the track to the horizontal frame member of the window frame.

An octagonally shaped index cam 27b includes a base 36b having a substantially planar lower surface 37b and presenting eight equal sides or surfaces 38b that extend downwardly and outwardly. The base 36b also has a substantially flat upper surface 41b which is provided with an eccentrically positioned link engaging pivot 42b projecting upwardly therefrom. The pivot 42b also has an upwardly facing slot 43b therein and is provided with an outwardly projecting annular snap-lock element 44b in the manner of the embodiments of FIG. 1-5. It is again pointed out that the slot 43b in the pivot 42b provides the spring effect of the pivot when the opening 49b and the link 25b is pushed over the pivot with snap-coupling effect.

The track 23b has an upwardly struck cam engaging element 45b having an opening 46b in its upper end. The cam engaging element also has the downwardly tapered octagonal configuration corresponding to the octagonal configuration of the index cam 27b and of a size to fit over the index cam 27b in mating relation therewith. Each surface of the cam-engaging element engages one of the flat surfaces of the index cam 27b. The index cam 27b has a center position 50 and is shiftable in either direction to reposition the pivot 42a relative to the track. In this regard, when the index cam is indexed through an arc of 45° this repositioning will shift the casement sash unit 0.057 inches. If the index cam is shifted 90° in either direction relative to the center position, this movement will shift the casement sash 0.080 inches.

It will be seen from the foregoing that all of the embodiments of the index cam and the cam engaging element of the track permit repositioning of the casement sash in either direction to overcome the problem of sash sag. Since both top and bottom of the casement sash can be adjusted, this allows a relatively large degree of sash sag to be corrected with this novel index cam and cam engaging arrangement. For example, the top of the casement sash may be shifted in one direction and the bottom of the casement sash may be shifted in the opposite direction to permit a substantial amount of repositioning of the casement window when this amount of adjustment is required.

It will therefore be seen that I have provided a novel and improved cam adjustment device for casement sash units which is highly effective in correcting sash sag.

What is claimed is:

1. A track and hinge assembly set for use with a casement window sash unit mounted on the window frame of a building, the window frame including upper and lower horizontal frame members connected by vertical frame members, said track and hinge assembly comprising similar upper and lower track assemblies, each track and hinge assembly including an elongate horizontal L-shaped track secured to one of the horizontal frame members, a hinge mechanism including a pair of pivotally interconnected links, one of which is secured to the casement window sash and pivotally and slidably connected with the track for shifting the casement window sash between opened and closed positions, each track having a convex cam engaging element projecting outwardly therefrom adjacent one end thereof, said cam engaging element having an inner surface and having a open outer end, locking means on the inner surface of said cam engaging element, an index cam including a base having a shape corresponding to the shape of the cam-engaging element, said index cam positioned within the cam-engaging element in engaging relation therewith, a link engaging pivot integral with said base and extending outwardly through the opening in the cam-engaging element and being pivotally connected to one end of the other link, locking means on said base engaging said locking means on the cam-engaging element, said index cam when disengaged from said cam-engaging element being shiftable from a center position in either direction to an adjusted position and thereafter re-engaged in locked relation with the cam-engaging element to shift the link engaging pivot a predetermined amount and thereby shift the sash relative to the window frame to overcome sash sag.

2. The track and hinge assembly set as defined in claim 1 wherein said index cam is shiftable longitudinally of the cam-engaging element and track in either direction relative to the center position when adjusting the position of the link engaging pivot.

3. The track and hinge assembly set as defined in claim 2 wherein said locking means on said cam-engaging element and said index cam base respectively comprises serrations thereon, said serrations on the cam base engaging serrations on the cam engaging element when the index cam is in the centered or an adjusted position.

4. The track and hinge assembly set as defined in claim 1 wherein said cam engaging element and index cam are each of frustro-conical configuration, said link engaging pivot being eccentrically positioned with respect to said base, said index cam being rotatable in either direction from said center position when adjusting the position of the link engaging pivot.

5. The track and hinge assembly set as defined in claim 4 wherein said locking means on said cam-engaging element comprises a plurality of locking recesses therein, said locking means on said index cam comprising a locking detent on said base engaging in one of said recesses when the index cam is in the center or adjusted positions.

6. The track and hinge assembly set as defined in claim 1 wherein said index cam and said cam-engaging element each taper downwardly and outwardly, said locking means on said index cam and cam-engaging element respectively comprising a plurality of mating similar flat surfaces, said link engaging pivot being eccentrically positioned with respect to said base, said index cam being rotatable in either direction from said center position to an adjusted position when adjusting the position of the link engaging pivot.

7. The track and hinge assembly set as defined in claim 6 wherein said index cam and said cam-engaging element are each of octogonal configuration.

*8. A track and hinge assembly set for use with a casement window sash unit mounted on the window frame of a building, the window frame including upper and lower horizontal frame members connected by vertical frame members, the track and hinge assembly comprising; similar upper and lower track and hinge assemblies, each track and hinge assembly including an elongate horizontal track each secured to a one of the respective horizontal frame members,*

*each assembly including a hinge mechanism including first and second pivotally interconnected links, the first link being connected to the sash unit and having one of its ends pivotally and slidably connected to the track, and the second link being connected at one of its ends to the first link; and*

*an angularly adjustable cam engaging the horizontal track and including an eccentrically mounted post forming an adjustable attachment to the other end of the second link, angular adjustment of the cam offsetting the post with respect to the track to overcome sash sag.*

*9. A track and hinge assembly set for use with a casement window sash unit mounted on the window frame of a building, the window frame including upper and lower horizontal frame members connected by vertical frame members,*

*said track and hinge assembly comprising similar upper and lower track assemblies, each track and hinge assembly including an elongate horizontal L-shaped track secured to a respective one of the horizontal frame members, a hinge mechanism including a pair of pivotally interconnected links, one link being secured to the casement window sash and having one of its ends pivotally and slidably connected with the track for shifting the casement window sash between opened and closed positions, the other link having one of its ends connected to said one link, each track having a cam engaging portion adjacent one end thereof; and*

*a rotatable cam engaging said cam engaging portion, and including an eccentrically defined link engaging post extending outwardly therefrom and pivotally connected to the other end of the other link, wherein said cam repositions said post with respect to said track when rotated to overcome sash sag.*

* * * * *

UNITED STATES PATENT AND TRADEMARK OFFICE

CERTIFICATE OF CORRECTION

PATENT NO. : Re. 34,657

DATED : July 12, 1994

INVENTOR(S) : Jack C. LaSee

It is certified that error appears in the above-identified patent and that said Letters Patent is hereby corrected as shown below:

On the page item [64], delete "0,740,752" and insert --5,074,075-- therefor.

Signed and Sealed this

Tenth Day of January, 1995

*Attest:*

Bruce Lehman

BRUCE LEHMAN

*Attesting Officer*

*Commissioner of Patents and Trademarks*